US011453159B2

(12) United States Patent
Stroud et al.

(10) Patent No.: US 11,453,159 B2
(45) Date of Patent: Sep. 27, 2022

(54) OSCILLATING SMOOTHING DEVICE FOR A THREE-DIMENSIONAL PRINTER

(71) Applicant: The ExOne Company, North Huntingdon, PA (US)

(72) Inventors: Adam W. Stroud, Rosharon, TX (US); Lucas W. Phalen, Belmont, OH (US)

(73) Assignee: ExOne Operating, LLC., North Huntingdon, PA (US)

( * ) Notice: Subject to any disclaimer, the term of this patent is extended or adjusted under 35 U.S.C. 154(b) by 0 days.

(21) Appl. No.: 15/929,919

(22) Filed: May 29, 2020

(65) Prior Publication Data

US 2021/0114289 A1 Apr. 22, 2021

Related U.S. Application Data

(60) Provisional application No. 62/854,093, filed on May 29, 2019.

(51) Int. Cl.

| | |
|---|---|
| *B29C 64/214* | (2017.01) |
| *B29C 64/153* | (2017.01) |
| *B29C 64/245* | (2017.01) |
| *B29C 64/188* | (2017.01) |
| *B29C 64/236* | (2017.01) |
| *B29C 64/232* | (2017.01) |
| *B29C 64/209* | (2017.01) |
| *B29C 64/30* | (2017.01) |
| *B33Y 40/00* | (2020.01) |
| *B29C 64/329* | (2017.01) |
| *B22F 12/67* | (2021.01) |
| *B22F 12/52* | (2021.01) |
| *B33Y 30/00* | (2015.01) |
| *B29C 31/02* | (2006.01) |

(52) U.S. Cl.
CPC ............ *B29C 64/153* (2017.08); *B22F 12/52* (2021.01); *B22F 12/67* (2021.01); *B29C 64/188* (2017.08); *B29C 64/209* (2017.08); *B29C 64/214* (2017.08); *B29C 64/232* (2017.08); *B29C 64/236* (2017.08); *B29C 64/245* (2017.08); *B29C 64/30* (2017.08); *B29C 64/329* (2017.08); *B33Y 40/00* (2014.12); *B22F 2202/01* (2013.01); *B29C 31/02* (2013.01); *B33Y 30/00* (2014.12)

(58) Field of Classification Search
CPC ... B29C 64/153; B29C 64/329; B29C 64/214; B29C 64/188; B29C 31/02; B22F 12/52; B22F 12/67; B22F 2202/01
See application file for complete search history.

(56) References Cited

U.S. PATENT DOCUMENTS

| | | | | |
|---|---|---|---|---|
| 9,486,962 | B1 * | 11/2016 | Dugan | ................... B29C 64/214 |
| 10,166,718 | B2 * | 1/2019 | Park | ........................ B29C 64/35 |
| 10,363,730 | B2 * | 7/2019 | Klein | ..................... B33Y 10/00 |

(Continued)

FOREIGN PATENT DOCUMENTS

CN 201168783 Y * 12/2008

*Primary Examiner* — Atul P. Khare
(74) *Attorney, Agent, or Firm* — Philip D. Lane

(57) ABSTRACT

A powder layer smoothing devices adapted for use with powder-layer three-dimensional printers are described. The smoothing devices include an oscillating smoothing device that includes a leading edge adapted to cut, remove, and redistribute excess powder in a powder layer. A leveling sled follows the leading edge to trowel and compact the powder in the powder layer.

16 Claims, 4 Drawing Sheets

(56) References Cited

U.S. PATENT DOCUMENTS

| | | | | |
|---|---|---|---|---|
| 10,449,718 | B1* | 10/2019 | Stroud | B22F 12/63 |
| 2015/0367448 | A1* | 12/2015 | Buller | B23K 26/70 |
| | | | | 219/74 |
| 2017/0120329 | A1* | 5/2017 | Orange | B22F 9/082 |
| 2017/0240472 | A1* | 8/2017 | Blacker | C09D 139/06 |
| 2019/0358901 | A1* | 11/2019 | Dugan | B29C 64/205 |
| 2021/0237360 | A1* | 8/2021 | Champion | B29C 64/393 |
| 2021/0354380 | A1* | 11/2021 | Champion | B29C 64/214 |
| 2021/0362413 | A1* | 11/2021 | Van Der Werff | B33Y 10/00 |

* cited by examiner

OSCILLATING SMOOTHING DEVICE FOR A THREE-DIMENSIONAL PRINTER

CROSS-REFERENCE TO RELATED APPLICATIONS

This application claims priority to and the benefit of U.S. Provisional Patent Application No. 62/854,093 filed May 29, 2019, which is incorporated by reference herein in its entirety.

BACKGROUND OF THE INVENTION

Field of the Invention

The present invention relates to powder-layer three-dimensional printers having a oscillating smoothing device that includes a leading blade and a leveling sled.

Background of the Art

There are today various types of three-dimensional printers, i.e. devices that convert electronic representations of three-dimensional articles into the articles themselves by the systematic building-up of one or more materials. The device of the present invention finds particular utility with the types of three-dimensional printers which create three-dimensional articles by selectively binding together preselected areas of successively deposited layers of powder. These types of three-dimensional printers are referred to herein as "powder-layer three-dimensional printers" because the construction of the three-dimensional article by such printers utilizes layers of powders as a build material. Examples of such types of powder-layer three-dimensional printers include, without limitation, the binder-jet three-dimensional printers, the selective sintering three-dimensional printers, and the electron beam melting three-dimensional printers.

It is to be understood that the term "powder" is also sometimes referred to in the art as "particulate material" or "particles" and the term "powder" is to be construed herein as meaning any such material, by whatever name, that is used in such three-dimensional printers as a layer-forming material. Powder may comprise any type of material capable of taking on the powder form, e.g. metal, plastics, ceramics, carbon, graphite, composite materials, minerals, etc., and combinations thereof. The term "build powder" is used herein to refer to a powder which is used to form the powder layers and from which the article is built in a powder-layer three-dimensional printer.

During the operation of a powder-layer three-dimensional printer, a first layer of a build powder is deposited upon a vertically indexible build platform and then successive powder layers are deposited one at a time upon the first powder layer. Selected portions of selected powder layers are treated to bind the powders in those portions together as one or more three-dimensional articles are formed. Collectively, the portions of the deposited powder layers which are not bound together are referred to herein as a "powder bed."

The process of forming a powder layer is sometimes referred to in the art, and is referred to herein, as "recoating." The device or combination of devices of a particular powder-layer three-dimensional printer that accomplishes the recoating is sometimes referred to in the art, and is referred to herein, as a "powder recoater" or more simply as a "recoater."

In some powder-layer three-dimensional printers, each powder layer is formed by transferring a predetermined quantity of build powder from an open-top stationary powder reservoir by first indexing upward a platform which supports the powder within the reservoir a predetermined amount to raise the predetermined quantity above the reservoir walls and then pushing that quantity of powder across the top of the build platform or the powder bed, e.g. by a doctor blade or a counter-rotating roller, to form a powder layer. Examples of such recoaters are described in U.S. Pat. No. 5,387,380 to Cima et al. Such recoaters are generally limited for use with relatively small size powder beds, i.e. those which having recoating direction lengths of under a few tens of centimeters.

In some powder-layer three-dimensional printers, each powder layer is deposited upon the build platform or upon an extant powder bed by a recoater comprising a traveling powder dispenser which dispenses a build powder through an open slit as it traverses across the build platform or powder bed. Examples of such recoaters are described in U.S. Pat. No. 7,799,253 B2 to Hochsmann et al. Such recoaters may or may not include some device which is adapted to smoothen the top of the powder layer. As used herein, the term "smoothen" is to be interpreted as meaning operating on a quantity of powder so as to do at least one of (a) form at least a portion of the quantity of powder into a layer, (b) make at least a portion of the surface of a layer comprising the quantity of powder less rough, and (c) compress at least a portion of a layer comprising the quantity of powder. A mechanism which smoothens a quantity of powder is referred to herein as a "smoothing device."

An example of a prior art recoater having a smoothing device is shown in FIGS. 1A and 1B. Referring to FIG. 1A, there is shown a prior art recoater 2 comprising a bridge section 3 having at its ends first and second trolley mounts 4a, 4b which are adapted to attach the recoater 2 to a pair of parallel trollies (not shown) for selectively moving the recoater 2 across a powder bed (not shown). Referring now to FIG. 1B, there is shown a cross-sectional view of the recoater 2 taken along cutting plane 1B-1B in FIG. 1A. The recoater 2 includes an upper powder reservoir 5, a powder dispensing mechanism 7, and a powder smoothing device in the form of a motorized counter-rotating roller 6 having a smooth cylindrical face. During operation, the recoater 2 travels in the direction indicated by the arrow A dispensing powder (not shown) from the upper powder reservoir 5 and the lower powder reservoir 8 through a valve onto the powder support plate 9 and therefrom onto the powder bed (not shown). The counter rotating roller 6 follows the powder dispensing mechanism 7 and contacts the deposited powder with the smooth face of the roller so as to smoothen the deposited powder as well as provide a certain level of compaction to the deposited powder.

Although the cylindrical rollers existing in the art today generally work for their intended purposes, there is room for improvement with regard to recoating speed for the smoothing of deposited powders. Even a small increase in speed of the smoothing of a single layer becomes significant when multiplied the hundreds or thousands number of layers needed to produce an article or articles in a powder bed.

SUMMARY OF THE INVENTION

The present invention provides powder-layer three-dimensional printers comprising a build box adapted to contain a powder bed, a smoothing device comprising an oscillating leveler comprising a leading blade and a leveling sled. A carriage may be adapted to move the smoothing device across the build box.

Some embodiments of the invention may include, a powder-layer three-dimensional printer comprising a build box adapted to contain a plurality of powder layers to form a powder bed, an oscillating smoothing device comprising a leading blade, a compaction sled, and an oscillating motor, wherein the oscillating motor imparts oscillating motion to at least one of the leading blade and compaction sled. A smoothing device mount is adapted to move the oscillating smoothing device across the build box.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention.

DESCRIPTION OF PREFERRED EMBODIMENTS

Figure 1A:
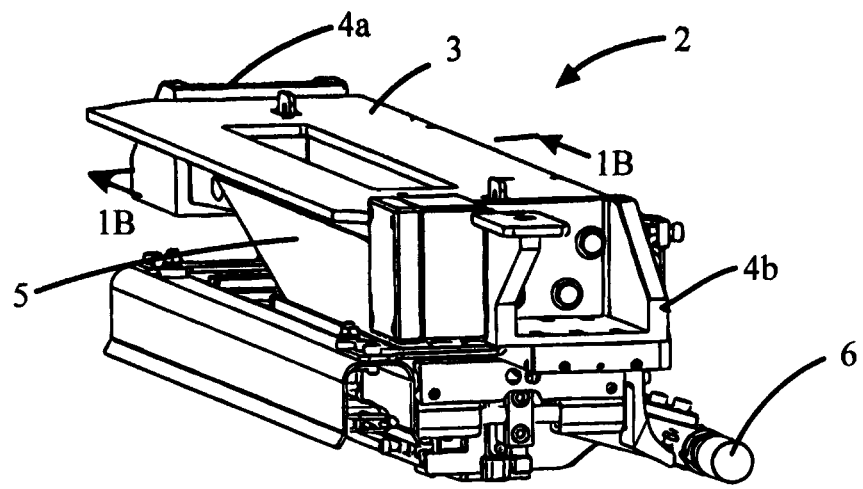
FIG. 1A is an isometric view of a prior art recoater having a powder dispensing mechanism and a counter rotating roller.
Figure 1B:
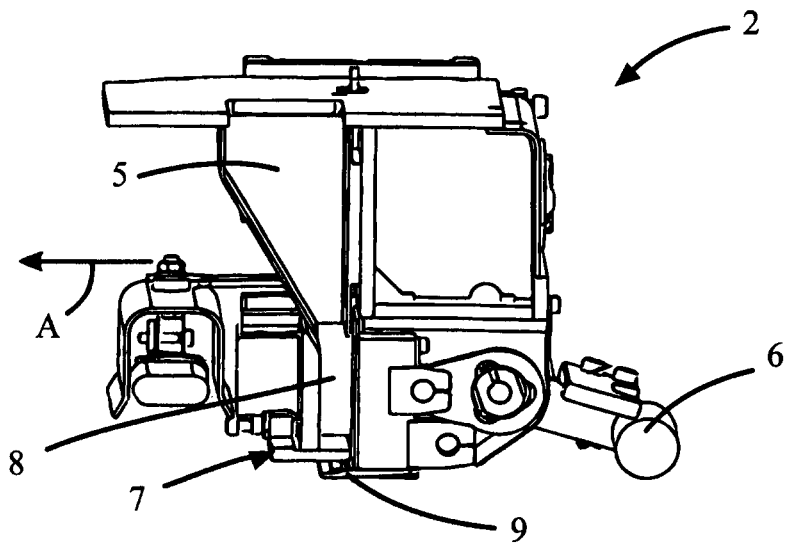
FIG. 1B is an isometric cross-sectional view of the prior art recoater of FIG. 1A sectioned along cutting plane 1B-1B of FIG. 1A.

Some preferred embodiments of the present invention are described in this section in detail sufficient for one skilled in the art to practice the present invention without undue experimentation. It is to be understood, however, that the fact that a limited number of preferred embodiments are described in this section does not in any way limit the scope of the present invention as set forth in the claims.

It is to be understood that whenever a range of values is described herein, i.e. whether in this section or any other part of this patent document, that the range includes the end points and every point therebetween as if each and every such point had been expressly described. Unless otherwise stated, the words "about" and "substantially" as used herein are to be construed as meaning the normal measuring and/or fabrication limitations related to the value or condition which the word "about" or "substantially" modifies. Unless expressly stated otherwise, the term "embodiment" is used herein to mean an embodiment of the present invention.

The smoothing devices of the present invention have particular utility with powder-layer three-dimensional printers. Although the smoothing devices may be used with any type of powder-layer three-dimensional printers, for the sake of conciseness, the only type of powder-layer three-dimensional printers that will be discussed in this section are those of the binder-jetting three-dimensional printer type. The binder-jetting three-dimensional printers are also sometimes in the art referred to as "three-dimensional inkjet printers" because the binder jetting is done using a print head that resembles those developed for inkjet printing. The basic binder jetting three-dimensional printing process was invented 1980's and developed in the 1990's at the Massachusetts Institute of Technology and is described in several United States patents, including the following U.S. Pat. No. 5,490,882 to Sachs et al., U.S. Pat. No. 5,490,962 to Cima et al., U.S. Pat. No. 5,518,680 to Cima et al., U.S. Pat. No. 5,660,621 to Bredt et al., U.S. Pat. No. 5,775,402 to Sachs et al., U.S. Pat. No. 5,807,437 to Sachs et al., U.S. Pat. No. 5,814,161 to Sachs et al., U.S. Pat. No. 5,851,465 to Bredt, U.S. Pat. No. 5,869,170 to Cima et al., U.S. Pat. No. 5,940,674 to Sachs et al., U.S. Pat. No. 6,036,777 to Sachs et al., U.S. Pat. No. 6,070,973 to Sachs et al., U.S. Pat. No. 6,109,332 to Sachs et al., U.S. Pat. No. 6,112,804 to Sachs et al., U.S. Pat. No. 6,139,574 to Vacanti et al., U.S. Pat. No. 6,146,567 to Sachs et al., U.S. Pat. No. 6,176,874 to Vacanti et al., U.S. Pat. No. 6,197,575 to Griffith et al., U.S. Pat. No. 6,280,771 to Monkhouse et al., U.S. Pat. No. 6,354,361 to Sachs et al., U.S. Pat. No. 6,397,722 to Sachs et al., U.S. Pat. No. 6,454,811 to Sherwood et al., U.S. Pat. No. 6,471,992 to Yoo et al., U.S. Pat. No. 6,508,980 to Sachs et al., U.S. Pat. No. 6,514,518 to Monkhouse et al., U.S. Pat. No. 6,530,958 to Cima et al., U.S. Pat. No. 6,596,224 to Sachs et al., U.S. Pat. No. 6,629,559 to Sachs et al., U.S. Pat. No. 6,945,638 to Teung et al., U.S. Pat. No. 7,077,334 to Sachs et al., U.S. Pat. No. 7,250,134 to Sachs et al., U.S. Pat. No. 7,276,252 to Payumo et al., U.S. Pat. No. 7,300,668 to Pryce et al., U.S. Pat. No. 7,815,826 to Serdy et al., U.S. Pat. No. 7,820,201 to Pryce et al., U.S. Pat. No. 7,875,290 to Payumo et al., U.S. Pat. No. 7,931,914 to Pryce et al., U.S. Pat. No. 8,088,415 to Wang et al., U.S. Pat. No. 8,211,226 to Bredt et al., and U.S. Pat. No. 8,465,777 to Wang et al.

For ease of description the powder discharge from the recoater is described at some places herein in terms of a desired amount of powder. It is to be understood that the present invention may include controlling one or both of the amount of powder discharged from an inventive recoater and the rate at which powder is discharged from the recoater.

Figure 2:
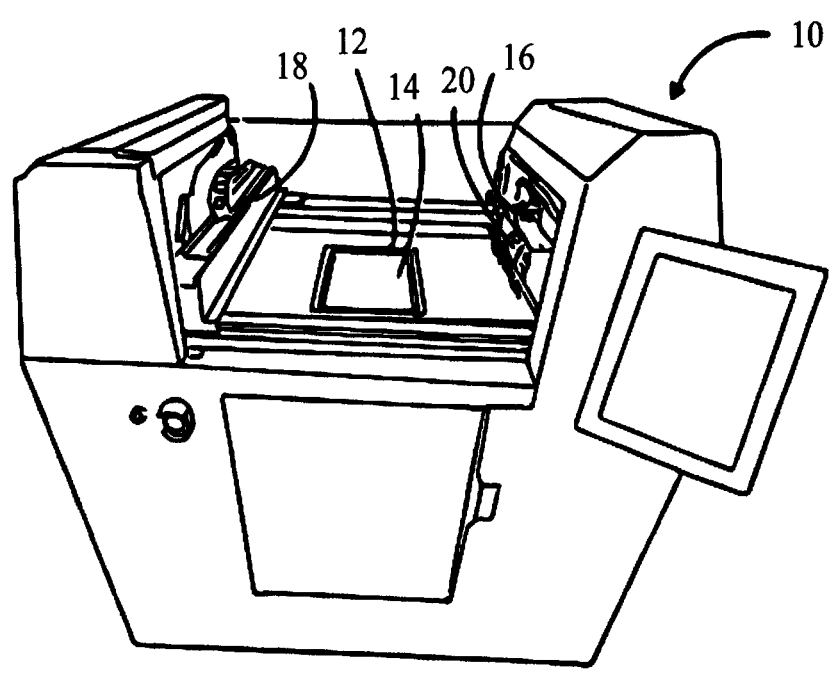
FIG. 2 is shown a schematic perspective view of an embodiment in the form of powder-layer three-dimensional printer 10.

Referring now to FIG. 2, there is shown a schematic perspective view of an embodiment in the form of powder-layer three-dimensional printer 10. The powder-layer three-dimensional printer 10 includes a build box 12 having a vertically indexible build platform (not visible) and containing a powder bed 14, a recoater 16, and a selectively positionable binder-jet printing device 18. During operation, the recoater 16 is moved over the build platform or powder bed 14 to deposit a powder layer thereupon. Typically the powder deposited by recoater 16 has surface imperfections that need to be removed or corrected prior to binder-jet printing device 18 applying binder to the powder bed. A smoothing device 20 is employed to smoothen the deposited powder to form a uniformly thick powder layer upon the pre-existing top surface of the powder bed 14. This may be accomplished during the traverse of the powder bed 14 by the recoater 16 during which the powder is dispensed or during a subsequent traverse of the powder bed 14. Another powder layer may then be deposited, if desired, or the binder-jet printing device 18 may then be moved over the powder bed 14 to selectively deposit binder onto the newly deposited layer and then moved back off of the powder bed 14 to permit the deposition of the next powder layer onto the powder bed 14.

Figure 3:
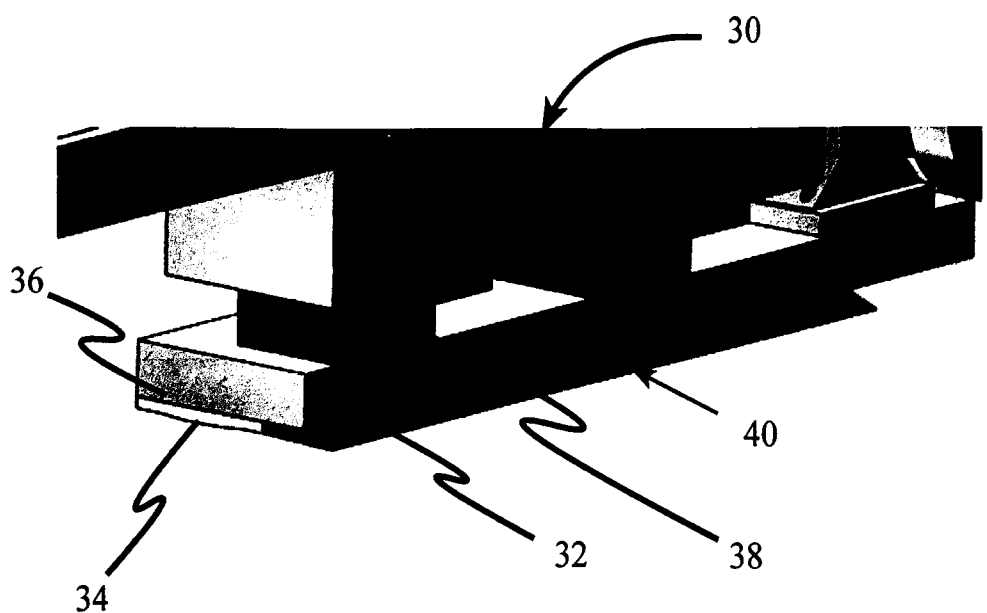
FIG. 3 is shown a schematic perspective view of an embodiment recoater.

Refer now to FIG. 3 which shows a schematic perspective view of an embodiment of an oscillating smoothing device 30 adapted for use with a powder layer three-dimensional printer. The oscillating smoothing device 30 includes a leading blade 32 and a leveling sled 34, which are supported by a smoothening device mount 36. One or more oscillating motors 38 may be mounted to the smoothening device mount 36 so as to provide oscillating movement which is in the same general plane as the powder layer in the build box and perpendicular to the direction of movement across the build box.

Figure 4:
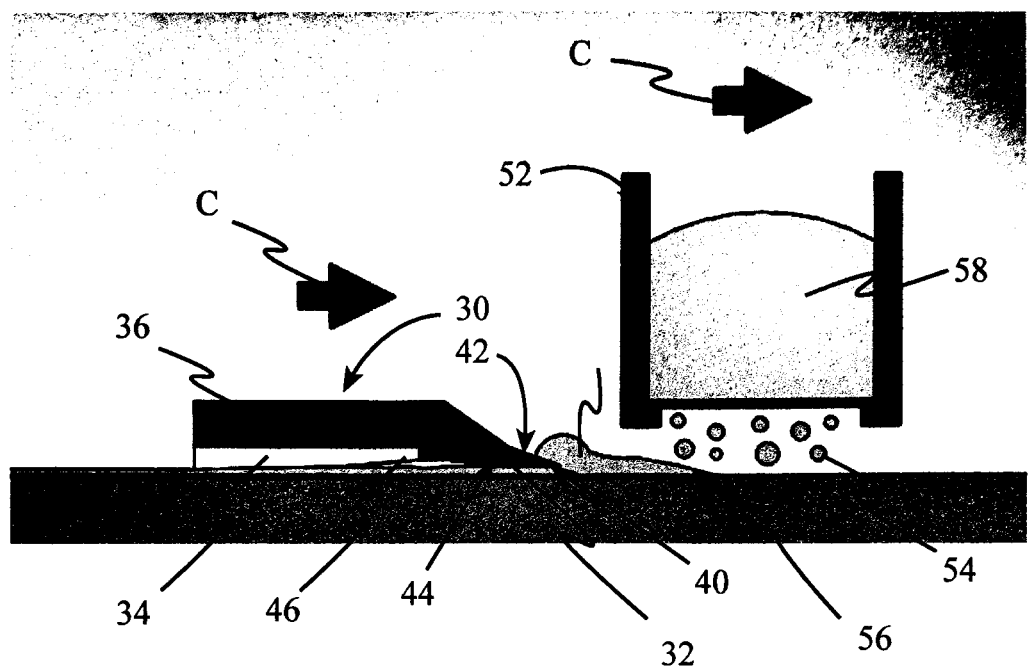
FIG. 4 is an isometric side view of an embodiment recoater shown in relation to a powder dispenser.

The leading blade 32 of the oscillating smoothing device 30 includes a leading edge 40 that extends substantially across the width of the powder bed. As illustrated in FIG. 4, with continuing reference to FIG. 3, the leading edge 40 provides the initial contacting surface of the oscillating smoothing device 30 to deposited powder 50 from a powder dispenser 52 as the oscillating smoothing device 30 traverses the powder bed in the direction of arrows C. The elements and mechanism for the powder dispenser 52 is not particularly limited and may include any variety of powder dispensers that are adapted hold a reservoir of powder 58 and to dispense selected or controlled amounts of powder 54 to the powder bed 56 of the powder-layer three-dimensional printer. In some embodiments, the oscillating smoothing device 30 and powder dispenser 52 may be connected as part of the recoater 16. It is to be understood that in some embodiments the smoothing device 30 does not have to be physically connected with the powder dispenser 52 and may be independently operable apart from the powder dispenser 52. Such an arrangement permits the movement of the smoothing device to be independent from the movements other parts of the recoater, even though such movements may be coordinated with each other. For example, when the recoater and powder dispenser are not physically connected, the smoothing device may operate and travel in a direction opposite, perpendicular or at an angle relative to the direction of travel for the powder dispenser.

With reference to the oscillating smoothing device 30, and in particular the leading blade 32, the leading edge 40 relocates, cuts, shears, or scrapes off a portion of the powder layer deposited by the powder dispenser 52. Preferably, the leading edge 40 is formed by converging top surface 42 and bottom surface 44. In certain embodiments, the bottom surface 44 is generally parallel to the powder bed. In other embodiment, the bottom surface 44 may be non-planar with the powder bed but preferably does not extend substantially into the powder bed. The top surface 42 provides a surface to carry powder removed from the powder bed by the leading edge 40. In some embodiments the leading blade 32 may include a planar concave, planar convex, chisel, or wedge shaped blade.

The leading blade 32 oscillates in a direction that is generally perpendicular to the direction of travel of the recoater or powder dispenser across the powder bed. The oscillating motors 40 control the amplitude and frequency of the oscillations for the leading blade 32. The amplitude and frequency may be independently adjusted and the particular combination of amplitude and frequency depend on the powder being utilized in the printer. Without intending to be bound by theory, it is believed that the oscillating motion of the leading blade 32 disrupts and overcomes the physical forces holding agglomerating powder together. The amplitude of the oscillation is preferably less than about 2 mm, and in some embodiments, about 1 mm or less. The frequency of the oscillations may be in the sonic or ultrasonic range, preferably 500 Hz or higher. Preferably the frequency is selected to avoid the vibration from causing significant stretching of the leading blade 32 instead of predominantly oscillating it. In some embodiments using ultrasonic vibration frequency, the amplitude is selected so as to be on the order of a low multiple of the mean particle size diameter, e.g. a multiple of in the range of about 2 to 10.

The leading blade of the oscillating smoothing device provides a shearing force to the surface of the deposited powder in the powder bed as the leading blade 32 moves across the powder bed. In this way, the leading blade 32 removes excess powder from high portions the powder bed surface and helps redistribute powder to low spots or depressions in the powder layer and removes excess powder from the build box.

With excess powder having been removed or redistributed by leading blade 32, a leveling sled 34 is adapted to compress or trowel a minimum amount of powder to further smooth and compact the deposited powder. The leveling sled 34 extends substantially across the width of the powder bed. The leveling sled follows the leading blade 32 as the oscillating smoothing device 30 travels across the powder bed. The leveling sled 34 includes a powder contacting surface 46 that starts above the powder bed extends a distance into the powder bed.

In some embodiments the powder contacting surface 46 is at an angle relative to the plane of the powder bed. The shape of the powder contacting surface 46 is not particularly limited and may include planar, convex, or concave shapes. In some embodiments the compaction sled 34 comprises a powder contacting surface 46 wherein at least a portion of the powder contacting surface 46 extends a distance further from the smoothing device mount 36 than the leading blade 32 such that the powder contacting surface 46 extends lower into the powder bed than the leading blade 32. In some embodiments, the distance of the powder contacting surface 46 extend away from the smoothing device mount and, thus into the powder bed, is adjustable. The difference in distance between the leading blade 32 and the furthest point of the powder contacting surface 46 away from the smoothing device mount 36 is adjustable and may range from about 1% to about 50% of the thickness of the powder layer. In additional embodiment range of adjustability may range from about 1% to about 40%, about 1% to about 25%, about 1% to about 20%, about 5% to about 40%, and about 5% to about 25%. This range may vary based on the ability of the powders to compact well. This percentage may increase as the compactability of the powder increases.

As described above, the leveling sled 34 trowels, compacts, and levels the powder layer of the powder bed. The materials used to make the leading blade or leveling sled may include metals, such as stainless steel, ceramics, hard plastics, or other rigid machinable materials.

While the embodiments illustrated in FIG. 3 and FIG. 4 show the leading blade 32 and the leveling sled 34 connected via a smoothing device mount 36, the leading blade and leveling sled may be decoupled such that they may operate independently. In this way the oscillating parameters may be independently controlled such that the leading blade and leveling sled operate with different amplitudes and frequencies. Further, the leveling sled 34 may be operated such that no oscillations are provided. In certain embodiments, the leading blade 32 and the leveling sled 34 are connected via a smoothing device mount and oscillating motors provide the oscillations for both the leading blade and leveling sled.

In some embodiments, the oscillating smoothing device 30 and powder dispenser 52 may be connected as part of the recoater 16, it is to be understood that in some embodiments the smoothing device 30 does not have to be physically connected with the powder dispenser 52 and may be independently operable apart from the powder dispenser 52. Such an arrangement permits the movement of the smoothing device to be independent from the movements other parts of the recoater, even though such movements may be coordinated with each other. For example, when the recoater and powder dispenser are not physically connected, the smoothing device may operate and travel in a direction opposite, perpendicular or at an angle relative to the direction of travel for the powder dispenser.

It is also to be understood that in some embodiments, the smoothing device may be employed selectively, i.e. only for selected layers and/or only for selected portions of selected layers, or for all layers. Further, in some embodiments a plurality of smoothing devices. Such smoothing devices may be used with the powder-layer three-dimensional printer and may include the same type or different types of counter rotating rollers and finishing rollers.

While only a few embodiments of the present invention have been shown and described, it will be obvious to those skilled in the art that many changes and modifications may be made thereunto without departing from the spirit and scope of the invention as described in the claims. All United States patents and patent applications, all foreign patents and patent applications, and all other documents identified herein are incorporated herein by reference as if set forth in full herein to the full extent permitted under the law.

What is claimed is:

1. A powder-layer three-dimensional printer comprising:
   a build box adapted to contain a plurality of layers of a deposited build powder to form a powder bed;
   an oscillating smoothing device comprising a leading blade, a compaction sled, and an oscillating motor, the leading blade including a leading edge facing a direction of movement of the oscillating smoothing device across the build box and providing an initial contact of the oscillating smoothing device with the deposited powder, and the compaction sled following the leading edge so as to trowel and compact the build powder forming the plurality of layers, wherein the compaction sled includes a powder contacting surface that starts above the powder bed and extends a distance into the powder bed, and wherein the oscillating motor imparts oscillating motion to at least one of the leading blade and compaction sled; and
   a smoothing device mount adapted to move the oscillating smoothing device across the build box, the leading blade and the compaction sled being connected via the smoothing device mount.

2. The powder-layer three-dimensional printer of claim 1, wherein the leading blade has a shape selected from the group consisting of planar concave, planar convex, chisel, or wedge shaped.

3. The powder-layer three-dimensional printer of claim 1, wherein at least a portion of the powder contacting surface extends a distance further from the smoothing device mount than the leading blade.

4. The powder-layer three dimensional printer of claim 3, wherein a difference in distance between the leading blade and a furthest point of the powder contacting surface from the smoothing device mount ranges from about 1% to about 25% of the thickness of the individual powder layers.

5. The powder-layer three-dimensional printer of claim 1, further comprising a powder dispenser adapted to deposit the powder in the build box.

6. The powder-layer three dimensional printer of claim 5, further comprising a recoater comprising the powder dispenser and the oscillating smoothing device.

7. The powder-layer three-dimensional printer of claim 1, wherein the oscillating motor imparts the oscillating motion to the leading blade such that the leading edge oscillates in the same plane of the powder layers and perpendicular to the direction of movement of the oscillating smoothing device across the build box with an amplitude of less than 2 mm.

8. The powder-layer three-dimensional printer of claim 7, wherein the oscillation amplitude is less than 1 mm.

9. The powder-layer three-dimensional printer of claim 1, wherein the oscillating motor imparts the oscillating motion to each of the leading blade and the compaction sled such that the leading edge and the leveling compaction sled oscillate in the same plane of the powder layers and perpendicular to the direction of movement of the oscillating smoothing device across the build box with an amplitude of less than 2 mm.

10. The powder-layer three-dimensional printer of claim 9, wherein the oscillation amplitude is less than 1 mm.

11. The powder-layer three-dimensional printer of claim 1, wherein the build powder has a mean particle size diameter, and wherein the oscillating motor imparts the oscillating motion to each of the leading blade and the compaction sled such that the leading edge and the compaction sled oscillate in the same plane of the powder layers and perpendicular to the direction of movement of the oscillating smoothing device across the build box with an amplitude that is two to ten times the mean particle size diameter.

12. The powder-layer three-dimensional printer of claim 11, wherein a frequency of the oscillation is in the ultrasonic range.

13. The powder-layer three-dimensional printer of claim 1, wherein each of the leading edge of the leading blade and the compaction sled extends substantially across the width of the powder bed.

14. The powder-layer three-dimensional printer of claim 1, wherein the leading edge is formed by a converging top surface and bottom surface of the leading blade, the bottom surface being generally planar to the powder bed.

15. The powder-layer three-dimensional printer of claim 1, wherein the leading blade provides a shearing force to the surface of the deposited powder as the oscillating smoothing device moves across the powder bed so as to remove excess powder from high portions of the powder bed, redistribute powder to low spots or depressions in a given one of the powder layers, and remove excess powder from the build box.

16. The powder-layer three-dimensional printer of claim 1, wherein the distance of the powder contacting surface extending into the powder bed is adjustable.

* * * * *